(12) United States Patent
Holtman

(10) Patent No.: US 7,865,059 B2
(45) Date of Patent: Jan. 4, 2011

(54) DEVICE AND METHOD FOR RECORDING INFORMATION INCLUDING REALTIME DATA IN ACCORDANCE WITH A PREDEFINED RECORDING FORMAT

(75) Inventor: Koen Johanna Guillaume Holtman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1038 days.

(21) Appl. No.: 10/574,453

(22) PCT Filed: Oct. 1, 2004

(86) PCT No.: PCT/IB2004/051950

§ 371 (c)(1),
(2), (4) Date: Apr. 4, 2006

(87) PCT Pub. No.: WO2005/034117

PCT Pub. Date: Apr. 14, 2005

(65) Prior Publication Data

US 2008/0247075 A1    Oct. 9, 2008

(30) Foreign Application Priority Data

Oct. 7, 2003  (EP) .................................. 03103710

(51) Int. Cl.
*H04N 5/85* (2006.01)
(52) U.S. Cl. .......................................... 386/95; 386/126
(58) Field of Classification Search ......... 386/124–126, 386/95, 96, 105–106
See application file for complete search history.

(56) References Cited

U.S. PATENT DOCUMENTS

| | | | | |
|---|---|---|---|---|
| 5,715,418 A | * | 2/1998 | Atsatt et al. | 711/202 |
| 5,930,450 A | * | 7/1999 | Fujita | 386/95 |
| 6,301,644 B1 | * | 10/2001 | Andoh et al. | 711/201 |
| 6,327,674 B1 | * | 12/2001 | Ito et al. | 714/8 |
| 7,200,771 B2 | * | 4/2007 | Bolt et al. | 714/8 |
| 2001/0016114 A1 | * | 8/2001 | Van Gestel et al. | 386/125 |
| 2002/0136118 A1 | | 9/2002 | Takahashi | |
| 2003/0014690 A1 | | 1/2003 | Frimout | |

FOREIGN PATENT DOCUMENTS

JP          02050829 A      2/1990

(Continued)

OTHER PUBLICATIONS

ECMA-267: 120mm DVD—Read-Only Disc 1997.

*Primary Examiner*—David E Harvey

(57) ABSTRACT

A device for recording information records a real-time data stream (51) in blocks having contiguous logical addresses (LA0-LA5) on a record carrier at corresponding physical addresses (PA0-PA8). The device has allocation means for allocating physical addresses to logical addresses, the allocation including at least one logically contiguous range of blocks allocated to at least a part of the real-time data stream. During recording, auxiliary data means (34,33) process auxiliary data related to the real-time data and record the auxiliary data as auxiliary blocks on the record carrier. The auxiliary data means assign physical addresses to the auxiliary blocks (61), which physical addresses are excluded from allocation to logical addresses and are within or near a physical address range (PA0-PA8) corresponding to the at least one logically contiguous range of blocks (LA0-LA5) allocated to the said part of the real-time data stream.

25 Claims, 4 Drawing Sheets

FOREIGN PATENT DOCUMENTS

Figure 3:
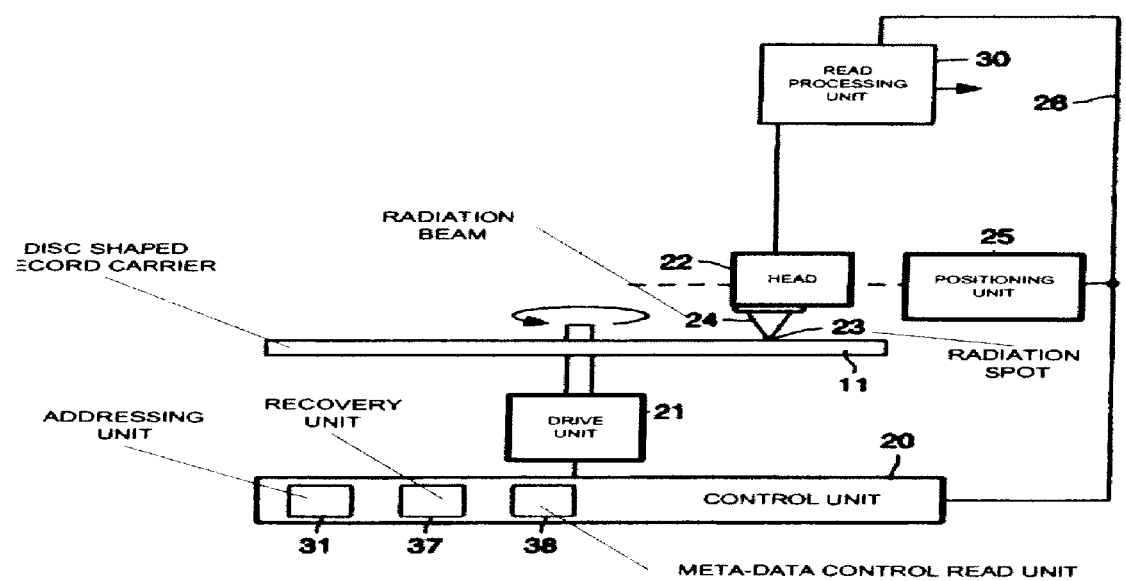

| | | |
|---|---|---|
| JP | 0928884 A | 11/1997 |
| JP | 2000076802 A | 3/2000 |
| JP | 2000113453 A | 4/2000 |
| JP | 2000123494 A | 4/2000 |
| JP | 2000251260 A | 9/2000 |
| JP | 2001075846 A | 3/2001 |
| JP | 2002279733 A | 9/2002 |
| JP | 2001083669 A | 10/2002 |
| WO | 9816014 A1 | 4/1998 |
| WO | 0028544 A1 | 5/2000 |

* cited by examiner

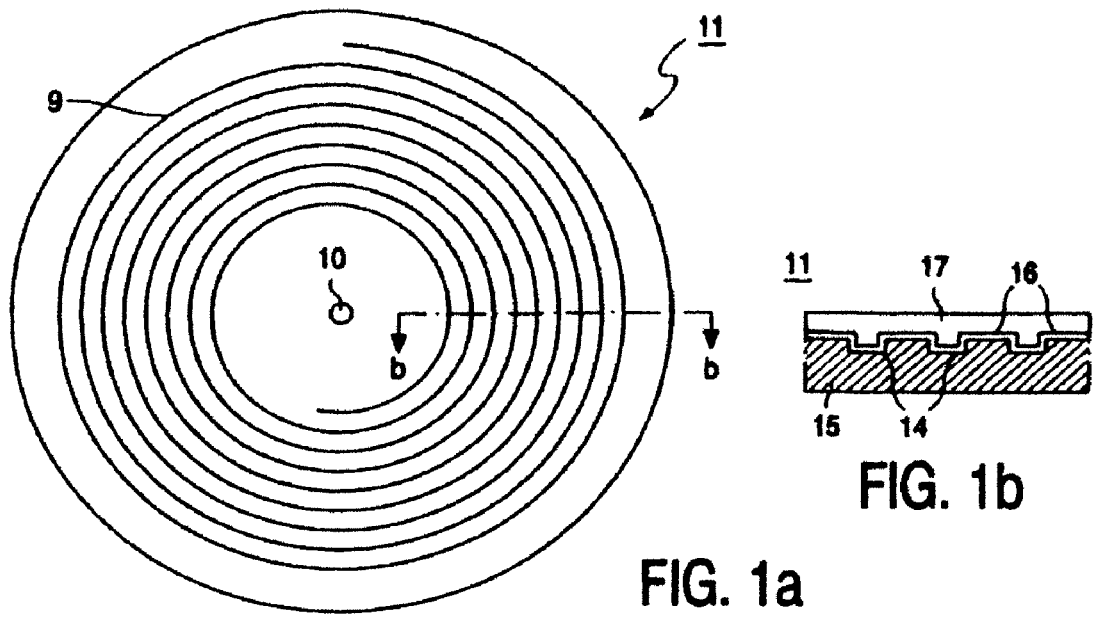
FIG. 1a
FIG. 1b
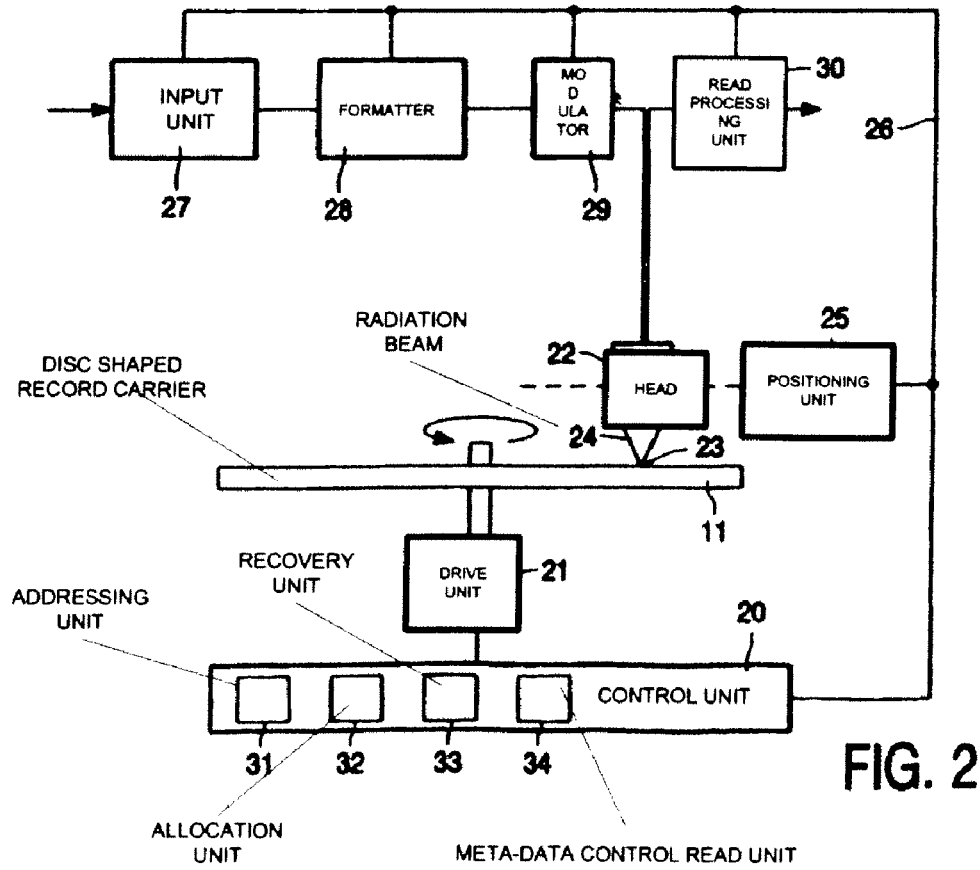
FIG. 2

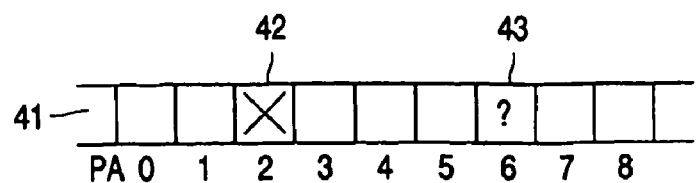
FIG. 4
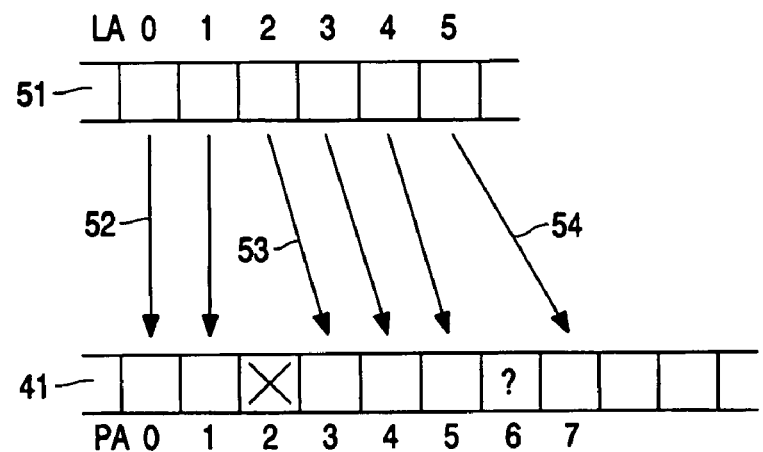
FIG. 5A
| LOG | PHYS |
|-----|------|
| 0 | 0 |
| 1 | 1 |
| 2 | 3 |
| 3 | 4 |
| 4 | 5 |
| 5 | 7 |
FIG. 5B

DEVICE AND METHOD FOR RECORDING INFORMATION INCLUDING REALTIME DATA IN ACCORDANCE WITH A PREDEFINED RECORDING FORMAT

The invention relates to a device for recording information, the information including real-time data of a real-time data stream in accordance with a predefined recording format.

The invention further relates to a device for reading information, the information including real-time data of a real-time data stream in accordance with a predefined recording format.

The invention further relates to a method of recording information in a track on a record carrier, the information including real-time data of a real-time data stream in accordance with a predefined recording format.

The invention relates to the field of recording real-time data such as a stream of digitally encoded audio or video, and in particular to recovery of unexpected interruptions of the recording such as a power failure.

A device and method for recording information on a record carrier are known from US 2003/0014690. The device has recording means for recording the information in information blocks having logical addresses on an optical disc in a track at allocated physical addresses. The logical addresses constitute a contiguous storage space. The document describes a power failure recovery mechanism, wherein recovery status information is maintained in a non-volatile memory, and recovery data is recorded on the record carrier. At power-up operation, the status information is used to determine the power failure and to reproduce the recovery data. The recovery data is recorded at a location indicated by a pointer in the non-volatile memory and may be multiplexed in the real-time data stream. Recording the recovery data at an arbitrary location on the record carrier requires arbitrary jumps of a recording head to different parts of the record carrier. Such jumps introduce a movement of the recording head (for example an optical pickup unit, OPU) and possibly also a medium rotational speed adjustment and rotational delay(s). Hence allowing such jumps during recording continuous data requires a substantial additional recording speed on top of the recording speed needed for recording the real-time data at the highest practical data rate, which additional speed is called headroom. Moreover, multiplexing the recovery data in the real-time data stream has the disadvantage that the recorded real-time data stream is different from the original real-time data stream.

It is an object of the invention to provide a recording system that allows a recording of auxiliary data without requiring substantial recording speed headroom and without substantially changing the real-time data stream.

For this purpose, the device for recording as described in the opening paragraph comprises recording means for recording marks in a track on a record carrier representing the information in blocks having logical addresses, and control means for controlling the recording by locating each block at a physical address in the track, the control means comprising addressing means for translating the logical addresses into the physical addresses and vice versa in dependence on allocation information, allocation means for generating and maintaining the allocation information, the allocation information including at least one logically contiguous range of blocks allocated to at least a part of the real-time data stream, and auxiliary data means for processing auxiliary data related to the real-time data and for recording the auxiliary data as auxiliary blocks on the record carrier, the auxiliary data means being coupled to the allocation means for assigning physical addresses to the auxiliary blocks, which physical addresses of the auxiliary blocks are excluded from allocation to logical addresses and are within or near a physical address range corresponding to the at least one logically contiguous range of blocks allocated to the said part of the real-time data stream.

For this purpose, the device for reading as described in the opening paragraph comprises reading means for reading marks in a track on a record carrier representing the information in blocks having logical addresses, and control means for controlling the reading by locating each block at a physical address in the track, the control means comprising addressing means for translating the logical addresses into the physical addresses and vice versa in dependence on allocation information, the allocation information including at least one logically contiguous range of blocks allocated to at least a part of the real-time data stream, and auxiliary data read means for processing auxiliary data related to the real-time data and for reading the auxiliary data as auxiliary blocks from the record carrier, the auxiliary data blocks having physical addresses that are excluded from allocation to logical addresses and are within or near a physical address range corresponding to the at least one logically contiguous range of blocks allocated to the said part of the real-time data stream.

For this purpose, the method as described in the opening paragraph comprises recording the information in blocks having logical addresses, and controlling the recording by locating each block at a physical address in the track, which controlling comprises translating the logical addresses into the physical addresses and vice versa in dependence on allocation information, generating and maintaining the allocation information, the allocation information including at least one logically contiguous range of blocks allocated to at least a part of the real-time data stream, processing auxiliary data related to the real-time data and for recording the auxiliary data as auxiliary blocks on the record carrier, and assigning physical addresses to the auxiliary blocks, which physical addresses of the auxiliary blocks are excluded from allocation to logical addresses and are within or near a physical address range corresponding to the at least one logically contiguous range of blocks allocated to the said part of the real-time data stream.

The measures have the effect that during recording of a logically contiguous series of blocks representing a continuous stream of real-time information the corresponding auxiliary data is recorded at physical addresses near the recorded real-time data but without interrupting the logical address range and without changing the real-time data itself. This has the advantage that the number of jumps by a head, e.g. an optical pickup unit (OPU), to different parts of the track is limited, and hence the performance of the device during continuous recording of data is improved. A higher data rate of the real-time data can be accommodated in particular for a device having a known maximum recording speed, because no frequent recording of auxiliary data is required at different locations on the record carrier.

The invention is also based on the following recognition. Optical media in general have quite a reasonable data rate, but the access performance (jumping over the disc) is rather limited. Hence for writing a file to the medium and/or reading the file as fast as possible, it is preferred to read the file from a physically contiguous area from the medium. For example, meta-data is generated and recorded separately in the auxiliary data means, and from time to time recovery data is accommodated on the record carrier as auxiliary data, because otherwise the last period before an interruption of the recording (i.e. for which the meta-data has not yet been recorded) would be irretrievably lost, or, alternatively, a large amount of non-volatile memory would be required to maintain all meta-data. Moreover, many predefined recording formats for real-time data do not allow auxiliary data to be included in the real-time data stream. The inventors have seen that at a different hierarchical level there is an option to store auxiliary data physically near the real-time data by controlling the allocation of logical to physical addresses. Hence physical addresses can be assigned to auxiliary data blocks without interrupting the logical address range. Since the auxiliary data blocks are not present in the logical address range of the real time data file, a legacy playback device that is not aware of the possibility of the existence of the auxiliary data will ignore the data blocks automatically, and not be affected by the presence of the auxiliary data. A new playback device, e.g. conforming to a newer version of a standard, is aware of the possibility of the existence of this auxiliary data, and will read both the real time file data blocks and the auxiliary data blocks, so that the auxiliary data is obtained in an efficient way, i.e. without requiring excursions to other parts of the medium and/or a lot of buffer memory, thus limiting the number of excursions that are necessary.

In an embodiment, the auxiliary data means comprises meta-data means for generating and maintaining meta-data for controlling rendering of the real-time data stream, and for recording at least part of the meta-data relating to said part of the real-time data stream on the record carrier after recording said part of the real-time data stream, and recovery means for generating recovery data for enabling retrieval of real-time data for which corresponding meta-data has not been recorded, and for recording the recovery data in the auxiliary blocks. This has the advantage that meta-data can be recovered while having a continuous logical address range for the real-time data stream. Hence real-time data can be retrieved although the corresponding meta-data had not yet been recorded in the location in accordance with the predefined recording format.

In an embodiment of the recording device, the recovery means is arranged for recording recovery status information in a predefined location on the record carrier. This has the advantage that a recovery process can be based on information on the record carrier, in particular also in a different recording device. For example, the recovery status information includes a status flag indicating that real-time recording is in progress and a pointer to a first location of a recovery block. Such recovery status information needs to be recorded only at the beginning of a real-time recording session, and therefore has substantially no effect on the headroom.

In an embodiment of the recording device, the auxiliary data means are arranged for including in the auxiliary blocks a unique signature and/or pointer information to other auxiliary blocks. Such a signature allows searching auxiliary data in a range of blocks on the record carrier. The pointer information allows locating further auxiliary blocks after detecting a first auxiliary block. This has the advantage that auxiliary data itself can be easily retrieved.

In an embodiment of the recording device, the recovery means is arranged for controlling the allocation means for allocating physical addresses to recovery blocks in dependence on defect management information, in particular by allocating physical addresses in a defect management area, or by allocating physical addresses near bad blocks. Such physical addresses are not available for normal allocation to user data because of predefined allocation rules. Hence allocating such physical addresses to recovery blocks has the advantage that the user data storage capacity is not affected by the recording of recovery data.

Further embodiments are given in the dependent claims.

Figures 6A, 6B:
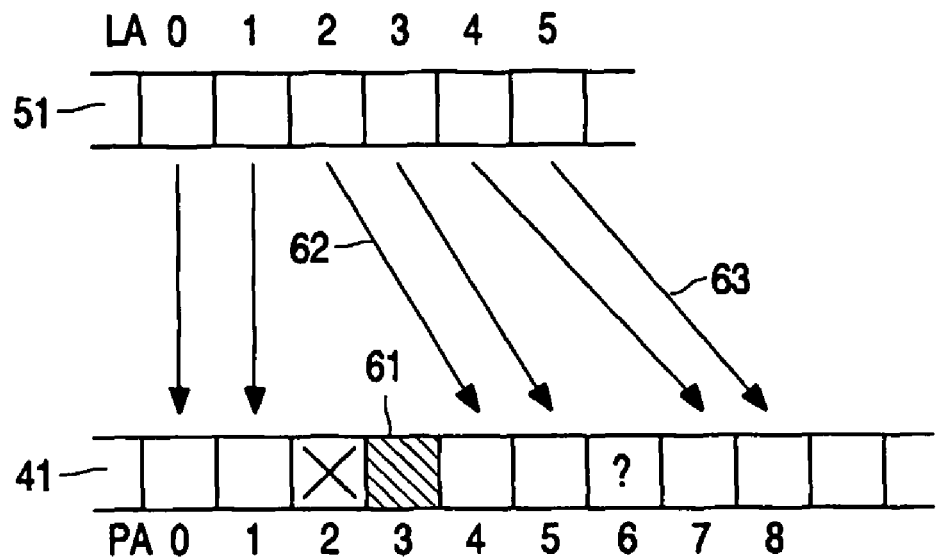

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording device, FIG. 3 shows a reading device, FIG. 4 shows locations for blocks of data in a track of a record carrier, FIG. 5A shows locations for blocks of data in a track of a record carrier and a corresponding real-time data stream, FIG. 5B shows allocation information corresponding to FIG. 5A, FIG. 6A shows locations for blocks of data in a track of a record carrier, a corresponding real-time data stream, and a recovery block, FIG. 6B shows allocation information corresponding to FIG. 6A. Corresponding elements in different Figures have identical reference numerals.

FIG. 1a shows a disc-shaped record carrier 11 having a track 9 and a central hole 10. The track 9, being the position of the series of (yet to be) recorded marks representing information, is arranged in a spiraling pattern of turns constituting substantially parallel tracks on an information layer. The record carrier may be optically readable, called an optical disc, and has an information layer of a recordable type. Examples of a recordable disc are the CD-RW, and rewritable versions of DVD, such as DVD+RW, and the high-density writable optical disc using blue lasers, called Blu-ray Disc (BD). Further details about the DVD disc can be found in reference: *ECMA-267: 120 mm DVD—Read-Only Disc—* (1997). The information is represented on the information layer by recorded optically detectable marks along the track, e.g. crystalline or amorphous marks in phase-change material. The track 9 on the recordable type of record carrier is indicated by a pre-embossed track structure provided during manufacture of the blank record carrier. The track structure is constituted, for example, by a pregroove 14 in FIG. 1b which enables a read/write head to follow the track during scanning. The track structure comprises position information including so-called physical addresses for indicating the locations of units of information, usually called information blocks. The position information includes specific synchronizing marks for locating the start of such information blocks.

FIG. 1b is a cross-section taken on the line b-b of the record carrier 11 of the recordable type, in which a transparent substrate 15 is provided with a recording layer 16 and a protective layer 17. The protective layer 17 may comprise a further substrate layer, for example in DVD, where the recording layer is at a 0.6 mm substrate and a further substrate of 0.6 mm is bonded to the back side thereof. The pregroove 14 may be implemented as an indentation or an elevation of the substrate 15 material, or as a material property contrasting with its surroundings.

The record carrier 11 is intended for carrying digital information in blocks in accordance with a predefined recording format. The recording format may include a file management system. An example of the predefined recording format is the Blu-ray Disc (BD), which defines recording of real-time data. Real-time information is information to be recorded and/or reproduced continuously, in particular information representing digitally encoded video in accordance with a standardized format like MPEG2. The recording format further defines meta-data for rendering the real-time data, such as navigation information or characteristic point information. During recording, the meta-data is generated after analysis of the received real-time information and may be stored, for example, in a predefined, separate location on the record carrier. Navigation information is provided for allowing a user to easily access a part of the recorded real-time data stream. Characteristic point information provides access to points in the encoded data stream where reproduction can be started. An example of Characteristic point information is described in WO 00/28544.

FIG. 2 shows a recording device for writing information on a record carrier 11 of a type which is writable or re-writable, for example CD-R or CD-RW, or DVD+RW or BD. The device is provided with recording means for scanning the track on the record carrier, which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused in a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. For writing information, the radiation is controlled to create optically detectable marks in the recording layer. The marks may be in any optically readable form, e.g. in the form of areas with a reflection coefficient different from their surroundings, obtained when recording in materials such as dye, alloy, or phase-change material, or in the form of areas with a direction of magnetization different from their surroundings, obtained when recording in magneto-optical material. For reading, the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by a read processing unit 30 of a usual type including a demodulator, deformatter, and output unit to retrieve the information. Hence retrieving means for reading information include the drive unit 21, the head 22, the positioning unit 25, and the read processing unit 30. The device comprises write processing means for processing the input information so as to generate a write signal to drive the head 22, which means comprise an (optional) input unit 27, and a formatter 28 and a modulator 29. During the writing operation, marks representing the information are formed on the record carrier. The marks are formed by means of the spot 23 generated on the recording layer via the beam 24 of electromagnetic radiation, usually from a laser diode. Digital data is stored on the record carrier in accordance with a predefined data format. Writing and reading of information for recording on optical disks and formatting, error correcting and channel coding rules are well-known in the art, e.g. from the CD and DVD systems.

The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory, and control gates for performing the procedures and functions in accordance with the invention as described below. The control unit 20 may also be implemented as a state machine in logic circuits.

In an embodiment, the device is arranged as a stand alone unit, for example a video recording apparatus for consumer use. The control unit 20, or an additional host control unit included in the device, is arranged to be directly controlled by the user and to perform the functions of a recording management system, e.g. including a file management system. The device includes application data processing facilities, e.g. audio and/or video processing circuits. User information is presented on the input unit 27, which may comprise compression means for input signals such as analog audio and/or video, or digital uncompressed audio/video. Suitable compression means are described, for example, for audio in WO 98/16014-A1 (PHN 16452) and for video in the MPEG2 standard. The input unit 27 processes the audio and/or video into units of information, which are passed on to the formatter 28. The read processing unit 30 may comprise suitable audio and/or video decoding units.

The formatter 28 is designed for adding control data and formatting and encoding the data in accordance with the recording format, e.g. by adding error correction codes (ECC), interleaving, and channel coding. Furthermore, the formatter 28 comprises synchronizing means for including synchronizing patterns in the modulated signal. The formatted units comprise address information and are written to corresponding addressable locations on the record carrier under the control of control unit 20. The formatted data from the output of the formatter 28 is passed on to the modulator 29, which generates a laser power control signal which drives the radiation source in the optical head. The formatted units presented to the input of the modulation unit 29 comprise address information and are written to corresponding addressable locations on the record carrier under the control of control unit 20.

The control unit 20 is arranged for controlling the recording by locating each block at a physical address in the track, and for executing a recovery system as described below. The control unit includes the following cooperating units: an addressing unit 31, an allocation unit 32, a recovery unit 33, and a meta-data unit 34, which units are implemented, for example, in firmware.

The addressing unit 31 is designed for translating physical addresses into logical addresses and vice versa in dependence on allocation information. The logical addresses constitute a contiguous storage space to be used for storing sequences of information blocks, such as a real-time data stream or files under the control of a file management system, for example UDF.

The allocation unit 32 is designed for generating and maintaining the allocation information. The allocation information includes translation tables for mapping logical addresses to corresponding physical addresses. The allocation is performed when new data is to be recorded by assigning currently unassigned physical addresses to a logical address needed for recording user data, e.g. part of a real-time data stream. For such a data stream, the allocation information includes at least one logically contiguous range of blocks allocated to at least a part of the real-time data stream.

The recording format may include predefined allocation rules. For example, the allocation rules include a rule that, for recording continuous real-time data, only a limited number of physical addresses in the range corresponding to the contiguous range of logical addresses is allowed to be bad (i.e. cannot be used for assigning). If said number is exceeded, the total area is skipped.

The meta-data unit 34 is designed for generating and maintaining meta-data. Meta-data is used for controlling the rendering of the real-time data stream. The meta-data unit further controls recording the meta-data on the record carrier. A particular amount of meta-data relates to a part of the real-time data stream on the record carrier and is generated during recording. Hence that amount can be recorded only after recording of said part, unless it has already been generated, e.g. provided with the stream on the input unit. For example, in the BD recording format the meta-data includes characteristic point information, which is to be recorded in a separate location on the record carrier.

The recovery unit 33 is designed for generating recovery data for enabling retrieval of real-time data for which corresponding meta-data has not been recorded. The recovery unit further controls the recording of the recovery data as recovery blocks on the record carrier. The recovery unit is coupled to the allocation unit for allocating physical addresses to the recovery blocks, which physical addresses are within or near a physical address range corresponding to the logically contiguous range of blocks allocated to the said part of the real-time data stream. FIGS. 5 and 6 depict the allocation of physical address for the recovery blocks in detail. It is noted that the process of generating recovery data, maintaining a recovery status, and performing a recovery process at power-up (if needed) is described in detail in the cited document US 2003/0014690. The current invention mainly relates to the way in which the recovery information is stored. The recovery information may contain meta-data, intermediate parameters for (re-)generating the meta-data, status information, control information like pointers to other recovery data, generation counters, etc. The recovery process basically is intended to create a normally readable file containing preferably all real-time data recorded up to the interruption, and normally readable meta-data including all meta-data that was generated, but that has not been recorded yet by the meta-data means up to the interruption. In the event that the interruption is only short, recording can be resumed and the gap in the real-time data may be repaired by adjusting control parameters in the real-time data.

In an embodiment, the control unit 20 includes a defect management unit for detecting defects and maintaining defect management information, for example by monitoring the signal quality of a read-out signal from the head 22 during recording and/or reading. The defects may also be detected by determining an error rate in retrieved information blocks. The defect management unit further maintains the defect management information in defect management areas on the record carrier, for example in defect lists as defined for the DVD recordable systems like DVD+RW. The defect management information at least includes information about bad or possibly bad blocks, and may also include remapping information.

The defect management areas are located on the record carrier in accordance with a recording area layout. In the layout, physical addresses are assigned to a specific logical address of a user data area, or to a defect management area or system area, etc. The layout may be predefined or may be defined by parameters included in the system area. The defect management information may include assignment information indicative of the assignment of physical addresses in first parts of the track to at least one user data area, the assignment of physical addresses in second parts of the track to defect management areas, and the assignment of the defect management information to the defect management areas. The assignment of the defect management information to the defect management areas indicates the use of the defect management area, for example a primary defect list and a secondary defect list, or a replacement area for a specific type of defects. The function of the defect management areas is determined by the recording format and the recording area layout.

In an embodiment of the device, the recovery unit 33 is arranged for controlling the allocation means for allocating physical addresses for recovery blocks in dependence on the defect management information. The defect management information may indicate that predefined blocks are available for defect management purposes. For example, a defect list may indicate that some blocks are possibly bad. Such blocks are not allowed to be allocated to normal user data blocks. The recovery unit may use locations of such blocks for locating a recovery block, possible after first testing the location for recordability. In an embodiment, the recovery unit may allocate physical addresses in a defect management area which is near to the recorded blocks of the real-time data. Alternatively, the recovery unit may allocate physical addresses near bad blocks, which physical addresses are not available for normal allocation due to constraints of the recording format. For example, a minimum number of consecutive physical addresses may be required for normal allocation in the recording format. Due to such rules some blocks may be unavailable for normal allocation and can be used for allocating recovery blocks.

FIG. 3 shows a reading device for retrieving information from a record carrier. The reading device has elements corresponding to the recording device of FIG. 2, in particular the drive unit 21, the head 22, the positioning unit 25, the read processing unit 30, and the control unit 20. It is to be noted that the functions of the reading device described below are usually also included in the recording device.

The control unit for the reading device has corresponding functions to the recording device, for example the addressing unit 31. Furthermore, the control unit has a meta-data read unit 38 for controlling the rendering of the real-time data stream in dependence on meta-data, for example based on a selected playback mode such as fast forward. The meta-data control read unit 38 first reads the meta-data relating to a part of the real-time data stream on the record carrier, and subsequently retrieves the relevant parts of the real-time data stream in dependence on the meta-data. In addition, the control unit has a recovery unit 37 for reading recovery data in recovery blocks in dependence on the allocation information from the record carrier in the event that recovery status information indicates that the record carrier contains an incomplete recording, i.e. real-time data for which the corresponding meta-data has not been recorded. The recovery unit 37 retrieves real-time data for which corresponding meta-data has not been recorded in dependence on the recovery data. The allocation information includes allocated physical addresses of the recovery blocks, which physical addresses are within or near a physical address range corresponding to the logically contiguous range of blocks allocated to the said part of the real-time data stream.

FIG. 4 shows locations for blocks of data in a track of a record carrier. In FIG. 4, a track 41 schematically shows a number of locations having physical addresses 0 to 8. The location at physical address 2 is a bad block 42, and the location at physical address 6 is a possibly bad block 43, which is not used for allocating a logical address. The information about the locations is usually available in defect management information, but may also be detected during recording.

FIGS. 5A, 5B show the allocation of logical addresses. In FIG. 5A, a stream of real-time data 51 schematically shows a number of blocks having logical addresses LA0 to LA5. As in FIG. 4, the track 41 schematically shows a number of locations having physical addresses PA0 to PA8 and bad blocks. The logical addresses are allocated to physical addresses as indicated by the arrows 52,53,54. The first arrow 52 indicates the allocation of logical address LA0 to physical address LA0; the second arrow 53 indicates the allocation of logical address LA2 to physical address PA3 while skipping bad block 42. The third arrow 54 indicates the allocation of logical address LA5 to physical address PA7 while skipping possibly bad block at PA6. The allocation follows the allocation rules of a recording format which includes defect management. FIG. 5B shows a Table of allocation information corresponding to FIG. 5A.

FIGS. 6A, 6B shows the accommodation of a recovery block. FIG. 6A shows locations for blocks of data in a track of a record carrier, a corresponding real time data stream, and a recovery block. As in FIGS. 5A and 5B, the stream of real-time data 51 schematically shows a number of blocks having logical addresses LA0 to LA5. As in FIG. 4, the track 41 schematically shows a number of locations having physical addresses PA0 to PA8 which include bad blocks. The logical addresses are allocated to physical addresses as indicated by the arrows 62,63, different from the allocation shown in FIGS. 5A and 5B. The first arrow 62 indicates the allocation of logical address LA2 to physical address PA4. A block at physical address PA3 has been skipped by the allocation of the real-time data. The skipping of the block at PA3 creates a location for a recovery block 61 that is physically enclosed in the address range of addresses [PA0-PA8]. The last arrow 63 indicates the allocation of logical address LA5 to physical address PA8, which is shifted with respect to FIGS. 5A and 5B due to the enclosed recovery block 61. FIG. 6B shows an allocation information table corresponding to FIG. 6A. It is noted that the allocation rules are adapted by the recovery unit by controlling the allocation unit 32 to occasionally skip a good block when allocating the real-time data stream. The recovery data is written to the skipped good block.

It is noted that the allocation information in the Tables shown in FIGS. 6A and 6B does not contain a direct indication of the location of the recovery blocks. The location of the recovery blocks may be included in a separate recovery table, which is maintained in a non-volatile memory or stored on the record carrier. Alternatively, the location of the recovery blocks may be included in the allocation information Tables by including an additional status indicator per allocated block that indicates the type of block, or a separate part of the allocation Table containing physical addresses of recovery blocks. In an embodiment, the location of the recovery blocks is not maintained or stored separately, but the recovery block itself is provided with a unique pattern in order to be identifiable. For retrieving such recovery blocks, a retrieval unit may search through blocks that potentially are recovery blocks, e.g. at physical addresses missing in the allocation Tables shown in FIGS. 6A and 6B.

In an embodiment of the device, the recovery unit 33 is arranged for recording recovery status information at a predefined location on the record carrier. The recording status information may be included in a system area on the record carrier having predefined contents, e.g. including a 'recording in progress' flag. Obviously the flag must be reset when the recording session has been completed. In an embodiment, the allocation unit 32 is controlled to allocate at least one predefined location to a recovery block. A first recovery block may be positioned at a fixed absolute physical address on the record carrier. The first recovery block may contain recovery status information, including a flag indicating the status of the recording session and pointer information for indicating a location of a recovery block. The pointer information constitutes a link to further recovery blocks for the recording session in progress. In a further embodiment, the physical address space is subdivided into ranges of physical addresses, and in each range a fixed location is reserved, e.g. ranges of 1024 blocks each having a recovery block at physical address 512 relative to the start of the range.

In an embodiment, the device comprises a non-volatile memory, and the recovery unit 33 is arranged for storing recovery status information in the non-volatile memory. At a power failure the non-volatile memory contains the last known recovery status, and at power-up the recovery status in the non-volatile memory is retrieved. If the recovery status indicates that a recording was in progress, a recovery process is activated. The non-volatile memory may further contain pointer information for indicating a location of a recovery block, or an additional amount of recovery information not yet recorded in a recovery block.

In an embodiment of the device, the recovery unit 33 is arranged for generating recovery data for recovering allocation information which has not been recorded. It is noted that in some devices the allocation unit or the file system used already has a recovery mechanism for the allocation tables. However, the recovery unit may (additionally) include the allocation information last generated in the recovery data, and/or in the recovery status information. Hence the recovery process at power-up may first recover the last allocation tables, and subsequently recover further data from the recovery blocks.

In an embodiment, the recovery unit 33 is arranged for including in the recovery blocks a unique signature. A unique signature may be, for example, a fixed header of the recovery block containing a number of bits having a predefined value. The signature may be selected to be in a location in the block where user data blocks also have a header with known contents. A simple flag may indicate that a recording was in progress. The unique signature provides an option for searching a recovery block without separately maintaining pointer information to that block. The recovery blocks may contain pointer information to other recovery blocks, for example a pointer to a previous and/or a next recovery block.

In an embodiment, the recovery unit 33 is arranged for controlling the allocation means for allocating at least two consecutive physical addresses to the recovery blocks. It is noted that existing allocation rules may limit the number of interruptions by bad blocks in a range of physical addresses, for example a maximum of 10 blocks may be bad within a consecutive range of 192 blocks, and said 10 blocks may generate a maximum of 5 interruptions. Hence allocating two or more physical addresses for recovery blocks limits the number of interruptions, and has less impact on further allocation options. Allocating at least one physical address adjacent to a bad block has a similar effect. In an embodiment, the recovery unit 33 is arranged for controlling the allocation means for allocating physical addresses for recovery blocks in dependence on defect management information, in particular by allocating physical addresses in a defect management area, or by allocating physical addresses near bad blocks.

In an embodiment, the recovery unit 33 is arranged for controlling the allocation unit 32 for de-allocating physical addresses previously allocated to the recovery blocks. The de-allocation is performed for a part of the real-time data stream after recording of the meta-data corresponding to said part. The recovery information has no function after recording said meta-data. Hence the de-allocated blocks can be used for other purposes.

Although the invention has been explained mainly with reference to embodiments based on recovery data as the auxiliary data, it is noted that auxiliary data in the current document indicates any type of data that is related to real-time data and needs to be stored as an additional, relatively low bit-rate, channel along with a stream of real-time data, also for purposes other than recovery after power interruptions. The invention may be used for various predefined recording formats like the Blu-ray Disc recording format, the CD-RW, or DVD+RW. Various types of defect management systems are suitable for applying the invention by including the auxiliary blocks in the allocation rules used for defects. Also for the information carrier an optical disc has been described, but other media, such as a magnetic hard disc, may be used.

It is noted, that in this document the word 'include' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. Device for recording information, the information including real-time data within a real-time data stream in accordance with a predefined recording format, which device comprises
   recording means for recording optically detectable marks in a track on a record carrier representing the information in information blocks having logical addresses, and
   control means for controlling the recording by locating each information block at a separate physical address in the track, the control means comprising:
      allocation means for generating and maintaining the allocation information, the allocation information including at least one logically contiguous range of blocks allocated to at least a part of the real-time data stream,
      addressing means for translating the logical addresses into the physical addresses and translating the physical addresses into logical addresses in dependence on allocation information,
      auxiliary data means for processing auxiliary data related to the real-time data and for recording the auxiliary data as auxiliary blocks on the record carrier, the auxiliary data means being coupled to the allocation means, whereby the allocation means assigns a physical addresses to the auxiliary information blocks, which physical addresses of the auxiliary blocks are excluded from allocation to logical addresses and are within a physical address range, which physical address range is allocated to the said part of the real-time data stream corresponding to the at least one logically contiguous range of information blocks.

2. Device as claimed in claim 1, wherein the auxiliary data means comprise:
   meta-data means for generating and maintaining meta-data for controlling the rendering of the real-time data stream and for recording at least part of the meta-data relating to said part of the real-time data stream on the record carrier after recording said part of the real-time data stream, and
   recovery means for generating recovery data for enabling a retrieval of real-time data for which corresponding meta-data has not been recorded and for recording the recovery data in the auxiliary information blocks.

3. Device as claimed in claim 2, wherein the recovery means are arranged for recording recovery status information at a predefined location on the record carrier.

4. Device as claimed in claim 2, further comprising a non-volatile memory, and the recovery means are arranged for storing recovery status information regarding said generating of recovery data in the non-volatile memory.

5. Device as claimed in claim 4, wherein the recovery means are arranged for generating the recovery status information including pointer information for indicating a location of a recovery block.

6. Device as claimed in claim 2, wherein the recovery means are arranged for generating recovery data for recovering allocation information which has not been recorded.

7. Device as claimed in claim 2, wherein the auxiliary data means are arranged for including in the auxiliary information blocks a unique signature and/or pointer information to other auxiliary information blocks.

8. Device as claimed in claim 1, wherein the auxiliary data means are arranged for controlling the allocation means for allocating at least two consecutive physical addresses to the auxiliary information blocks.

9. Device as claimed in claim 1, wherein the auxiliary data means are arranged for controlling the allocation means for allocating physical addresses for auxiliary blocks in dependence on defect management information, by allocating physical addresses in a defect management area or by allocating physical addresses near bad blocks.

10. Device as claimed in claim 2, wherein the recovery means are arranged for controlling the allocation means for de-allocating physical addresses previously allocated to the recovery information blocks for said part of the real-time data stream after recording of the meta-data corresponding to said part.

11. Device for reading information, the information including real-time data of a real-time data stream in accordance with a predefined recording format, which device comprises
   reading means for reading optically detectable marks in a track on a record carrier representing the information in information blocks having logical addresses, and
   control means for controlling the reading by locating each information block at a separate physical address in the track, the control means comprising:
      Allocation means for generating and maintaining the allocation information, the allocation information including information about at least one logically contiguous range of information blocks allocated to at least a part of the real-time data stream,
      addressing means for translating the logical addresses into the physical addresses and translating the physical addresses into logical addresses in dependence on allocation information, and
      auxiliary data read means coupled to the allocation means for processing auxiliary data related to the real-time data and for reading the auxiliary data as auxiliary information blocks from the record carrier,
      the auxiliary data information blocks having physical addresses that are excluded from allocation to logical addresses and are within a physical address range corresponding to the at least one logically contiguous range of blocks allocated to the said part of the real-time data stream.

12. Device as claimed in claim 11, wherein the auxiliary data read means comprise
  meta-data read means (38) for controlling rendering of the real-time data stream in dependence on meta-data and for reading the meta-data relating to said part of the real-time data stream on the record carrier, and
  recovery means for reading recovery data from the auxiliary information blocks and for retrieving real-time data for which corresponding meta-data has not been recorded in dependence on the recovery data.

13. Method of recording information in a track on a record carrier, the information including real-time data of a real-time data stream in accordance with a predefined recording format, which method comprises
  recording the information in information blocks having logical addresses, and
  controlling the recording by locating each information block at a physical address in the track, which controlling comprises:
    translating the logical addresses into the physical addresses and translating the physical addresses into logical addresses in dependence on allocation information,
    generating and maintaining the allocation information, the allocation information including at least one logically contiguous range of information blocks allocated to at least a part of the real-time data stream,
    processing auxiliary data related to the real-time data and for recording the auxiliary data as auxiliary information blocks on the record carrier, and
    assigning physical addresses to the auxiliary information blocks, which physical addresses of the auxiliary information blocks are excluded from allocation to logical addresses and are within a physical address range corresponding to the at least one logically contiguous range of blocks allocated to the said part of the real-time data stream.

14. Method as claimed in claim 13, wherein the step of processing auxiliary data comprises:
  generating and maintaining meta-data for controlling rendering of the real-time data stream, and recording at least part of the meta-data relating to said part of the real-time data stream on the record carrier after recording said part, and
  generating recovery data for enabling retrieval of real-time data for which corresponding meta-data has not been recorded, and recording the recovery data in the auxiliary information data blocks.

15. Device for recording information, the information including real-time data within a real-time data stream in accordance with a predefined recording format, which device comprises
  recording means for recording optically detectable marks in a track on a record carrier representing the information in information blocks having logical addresses, and
  control means for controlling the recording by locating each information block at a separate physical address in the track, the control means comprising:
    allocation means for generating and maintaining the allocation information, the allocation information including at least one logically contiguous range of blocks allocated to at least a part of the real-time data stream,
    addressing means for translating the logical addresses into the physical addresses and translating the physical addresses into logical addresses in dependence on allocation information,
    auxiliary data means for processing auxiliary data related to the real-time data and for recording the auxiliary data as auxiliary blocks on the record carrier, whereby the auxiliary data means comprise:
      meta-data means for generating and maintaining meta-data for controlling the rendering of the real-time data stream and for recording at least part of the meta-data relating to said part of the real-time data stream on the record carrier after recording said part of the real-time data stream, and
      recovery means for generating recovery data for enabling a retrieval of real-time data for which corresponding meta-data has not been recorded and for recording the recovery data in the auxiliary information blocks,
    the auxiliary data means being coupled to the allocation means, whereby the allocation means assigns a physical addresses to the auxiliary information blocks, which physical addresses of the auxiliary blocks are excluded from allocation to logical addresses and are within or near a physical address range, which physical address range is allocated to the said part of the real-time data stream corresponding to the at least one logically contiguous range of information blocks.

16. Device as claimed in claim 15, wherein the recovery means are arranged for recording recovery status information at a predefined location on the record carrier.

17. Device as claimed in claim 15, further comprising a non-volatile memory, and the recovery means are arranged for storing recovery status information regarding said generating of recovery data in the non-volatile memory.

18. Device as claimed in claim 15, wherein the recovery means are arranged for generating the recovery status information including pointer information for indicating a location of a recovery block.

19. Device as claimed in claim 15, wherein the recovery means are arranged for generating recovery data for recovering allocation information which has not been recorded.

20. Device as claimed in claim 15, wherein the auxiliary data means are arranged for including in the auxiliary information blocks a unique signature and/or pointer information to other auxiliary information blocks.

21. Device as claimed in claim 15, wherein the auxiliary data means are arranged for controlling the allocation means for allocating at least two consecutive physical addresses to the auxiliary information blocks.

22. Device as claimed in claim 15, wherein the auxiliary data means are arranged for controlling the allocation means for allocating physical addresses for auxiliary blocks in dependence on defect management information, by allocating physical addresses in a defect management area or by allocating physical addresses near bad blocks.

23. Device as claimed in claim 15, wherein the recovery means are arranged for controlling the allocation means for de-allocating physical addresses previously allocated to the recovery information blocks for said part of the real-time data stream after recording of the meta-data corresponding to said part.

24. Device for reading information, the information including real-time data of a real-time data stream in accordance with a predefined recording format, which device comprises
  reading means for reading optically detectable marks in a track on a record carrier representing the information in information blocks having logical addresses, and
  control means for controlling the reading by locating each information block at a separate physical address in the track, the control means comprising:

Allocation means for generating and maintaining the allocation information, the allocation information including information about at least one logically contiguous range of information blocks allocated to at least a part of the real-time data stream, addressing means for translating the logical addresses into the physical addresses and translating the physical addresses into logical addresses in dependence on allocation information, and auxiliary data read means coupled to the allocation means for processing auxiliary data related to the real-time data and for reading the auxiliary data as auxiliary information blocks from the record carrier, wherein the auxiliary data read means comprise meta-data read means (38) for controlling rendering of the real-time data stream in dependence on meta-data and for reading the meta-data relating to said part of the real-time data stream on the record carrier, and recovery means for reading recovery data from the auxiliary information blocks and for retrieving real-time data for which corresponding meta-data has not been recorded in dependence on the recovery data, and the auxiliary data information blocks having physical addresses that are excluded from allocation to logical addresses and are within or near a physical address range corresponding to the at least one logically contiguous range of blocks allocated to the said part of the real-time data stream.

25. Method of recording information in a track on a record carrier, the information including real-time data of a real-time data stream in accordance with a predefined recording format, which method comprises recording the information in information blocks having logical addresses, and controlling the recording by locating each information block at a physical address in the track, which controlling comprises:

translating the logical addresses into the physical addresses and translating the physical addresses into logical addresses in dependence on allocation information, generating and maintaining the allocation information, the allocation information including at least one logically contiguous range of information blocks allocated to at least a part of the real-time data stream, processing auxiliary data related to the real-time data and for recording the auxiliary data as auxiliary information blocks on the record carrier, and assigning physical addresses to the auxiliary information blocks, which physical addresses of the auxiliary information blocks are excluded from allocation to logical addresses and are within or near a physical address range corresponding to the at least one logically contiguous range of blocks allocated to the said part of the real-time data stream, wherein the step of processing auxiliary data comprises:

generating and maintaining meta-data for controlling rendering of the real-time data stream, and recording at least part of the meta-data relating to said part of the real-time data stream on the record carrier after recording said part, and generating recovery data for enabling retrieval of real-time data for which corresponding meta-data has not been recorded, and recording the recovery data in the auxiliary information data blocks.

\* \* \* \* \*